United States Patent Office 3,300,329
Patented Jan. 24, 1967

3,300,329
METAL-POLYOLEFIN COMPOSITIONS AND PROCESS FOR MAKING SAME
Joseph A. Orsino, Mountain Lakes, and Daniel F. Herman, Orange, N.J., and Jack J. Brancato, New Hyde Park, N.Y., assignors to National Lead Company, New York, N.Y., a corporation of New Jersey
No Drawing. Filed Sept. 26, 1960, Ser. No. 58,169
The portion of the term of the patent subsequent to Feb. 18, 1981, has been disclaimed
19 Claims. (Cl. 117—49)

This application is a continuation-in-part of our copending application, Serial No. 747,371, filed July 9, 1958, now abandoned.

This invention relates to a process of polymerizing olefinic materials directly on the surfaces of metal particles, to the products obtained thereby, to processes of forming new and useful articles from such products and to the articles resulting from such forming operations.

More particularly, the present invention is concerned with a simple, inexpensive process of forming a polyolefin such as polyethylene, polypropylene, polyisoprene or the like, directly on particles of metal so that each particle is substantially enclosed in a shell of the polyolefin that is bonded or attached thereto. The invention is concerned also with a variety of products that can be made from the polyolefin encased metal materials thus prepared.

Many procedures have been proposed heretofore for incorporating solid particles, including metal particles, in polymeric materials with the object of modifying or altering the properties of the polymeric materials, such as, to incorporate materials opaque to certain types of radiation, or to make the solid particles more readily dispersed in organic paint vehicles for incorporating metallic pigments into paint. To a great extent, the metal has been added in only minor amounts and has been added to the olefinic material after polymerization. Thus, after the olefinic materials is polymerized, the metal particles have been added by liquefying the polymerized olefinc material with heat or a solvent and stirring the metal particles into the liquefied polymer. Such procedure may result in degradation of the polymer and does not provide an even and uniform distribution of the metal in the polymer. This is particularly true where any substantial loading of the polymerized material with a metal is attempted. Also the use of solvents is limited to polymers which are soluble in the solvents.

One process employed for the addition of metal particles to polymerized olefin materials employs a mill of the type conventionally used in the rubber industry. In such process in the rubber industry. In such process the polymerized olefin and metal particles are added separately to the rolls of the mill and the metal is kneaded or blended into the polymer. This process, likewise, may result in degradation of the polymer particularly with a high temperature flowing polymer, and does not give an even and uniform distribution of the metal throughout the polymer.

In addition to the difficulties in adding small particles, fibers or filaments of a metal to the olefin polymer, by either the liquid or mechanical processes, the more rigid and highly crystalline polymers of this class do not readily lend themselves to either of these procedures even at the relatively low loading percentages in which these processes are more commonly employed.

It is an object of this invtntion to provide a process wherein small particles, fibers, or filaments of a metal may be easily and inexpensively enclosed in individual shells of a polyolefin plastic anchored securely to the metal particles. This permits more efficient use of the polymer, more even and uniform distribution of the metal particles and makes new kinds of formed objects and physical structures easy to fabricate.

Another object of the invention is to produce a product consisting of granules of polyolefin each containing small particles, fibers or filaments of a metal substantially encased therein, which product is readily free flowing but can very easily be cast, extruded, molded or otherwise formed into sheets, films, tubes or articles having a wide variety of shapes and capable of many different uses and applications, with the metal particles being uniformly distributed throughout resulting articles.

Another object of the invention is to form cast, molded or extruded articles varying widely in density and porosity in which the metal particles, fibers or filaments are evenly and uniformly dispersed throughout the article.

Other objects and advantages will be apparent to one skilled in the art from reading the present disclosure.

In accordance with the present invention, polyolefin is formed or polymerized from olefin monomer directly onto the surface of metal particles to form a shell covering each of the particles. Each particle maintains its individual identity throughout the process, there being little, if any, interconnecting or agglomerating of the metal particles during the polymerization process. Thus, each of the divided metal particles is surrounded by an individual shell of polymer, the product formed by the process is a granular free-flowing material. With each metal particle encased in a shell of olefin polymer, the product formed is a free-flowing powder and may be readily poured.

The metal particles may be of any desired size, even as small as sub-micron sizes, and are treated with a catalytic agent in accordance with the invention to form active polymerization sites on the particles. The olefin is then added to the catalytically treated metal particles and the monomer is polymerized at the surface sites of each of the particles and formed thereon. The formation of the polymer on the metal particles is substantially uniform, substantially all of the particles being encased in shells of the polymer, there being no substantial quantity of free polymer formed apart from the metal particles.

While the present invention will be discussed primarily in terms of covering small "particles" of a metal with a polyolefin, it should be understood that the term "particles" is intended to encompass short filaments and fibers of a metal. These forms of metals are commercially available. Also, the term is intended to cover liquid metal particles, such as those of mercury, as well as solid metal particles.

In the practice of the invention, various particle sizes of metal particles may be employed and, if desired to attain certain properties, different sizes and shapes may be employed or blended. Also particles of different metals may be blended and used. In most cases it is not necessary to employ particles of greater than 30 mesh in the largest dimension. Individual particles of some metals tend to agglomerate and form small clusters of the individual particles. These clusters or agglomerates are, in and of themselves, usually relatively small. In the practice of the present invention it has been observed that in the final product some clusters or agglomerated particles may be encased as a unit in a shell of the polymer. In addition to forming a shell around the agglomerate or cluster, the polymer may form in the interstices within the agglomerate. It is to be understood, as used herein, the term "particle" also includes clusters and agglomerates of small metal particles, fibers or filaments where such clusters and agglomerates are present in the treated encased product.

The process of encasing individual particles of metal in shells of polyolefin polymerized in situ thereon is preferably carried out by the use of what is known in the polyolefin art as an organometallic-transition metal catalyst system. The components of such a catalyst system, as will be understood by those skilled in the polymer art, react when mixed together to produce a substance or substances highly active as a polymerization initiator for the low molecular weight aliphatic 1-olefins.

Any of the aliphatic 1-olefins having less than 6 carbon atoms may be polymerized in accordance with our invention. These include the simplest 1-olefins such as ethylene, propylene, butene-1 and the like and also di-olefins such as butadiene-1,3 and isoprene. These 1-olefins may be used to form homopolymers, or mixtures of them may be polymerized together to form various copolymers. In addition, other compounds which are known to copolymerize with these 1-olefins to form useful products may be employed in combination therewith. We prefer to use ethylene or propylene which have the outstanding advantages of being gases at ordinary temperatures, of being relatively inexpensive and available in large quantities, and of producing polymers of high molecular weight having very desirable properties.

Catalyst systems which have been found useful in the process of this invention include any system having two or more components which, when mixed together, react to form a material that initiates the polymerization of the 1-olefins, and which have at least one component that will become fixed or attached in some way on the metal particles when brought in contact therewith prior to the complete reaction of such component with the other components of the system. In general, we have found that two component systems which are particularly suitable are those in which one component is an organometallic reagent such as an alkyl or aryl compound of one of the metals lithium, sodium, potassium, magnesium, calcium, zinc, cadmium, boron, or aluminum, and the other component is a transition metal compound such as a halide or ester of titanium, zirconium, vanadium or chromium. Other similar catalyst systems, containing two or more components, can be used as will be apparent to those skilled in the art of producing polyolefins.

Exemplary of the organometallic component of a satisfactory catalyst system are: butyllithium, amylsodium, phenylsodium, dimethyl magnesium, diethyl magnesium, diethyl zinc, methyl magnesiumbromide, butyl magnesium bromide, phenyl magnesium chloride, trimethylaluminum, triisobutylaluminum, triisopropylaluminum, trioctylaluminum, tridodecylaluminum, dimethylaluminum bromide, diethylaluminum chloride, ethylaluminum dibromide, isobutylaluminum sesquichloride, dipropylaluminum iodide, diisobutylaluminum fluoride, diisobutylalumnum bromide, diethylaluminum hydride, ethylaluminum hydride, diisobutylaluminum hydride, etc., and complexes of such organometallic compounds, as for example, sodium aluminum tetrabutyl, lithium aluminum tetracetyl, sodium aluminum triethylchloride, etc.

Exemplary of the transistion metal compounds of the two component catalyst system are: zirconium tetrachloride, titanium tetrachloride, titanium trichloride, vanadium dichloride, vanadium oxychloride, vanadium trifluoride, vanadium trichloride, vanadium oxydichloride, chromium trichloride, chromium acetonylacetonate, alkyl vanadates, alkyl titanates, etc.

Among the two component catalyst systems which may be used in the process of the invention are (1) a compound of the formula: $MX_p$ with (2) a compound of the formula: $R_{(z-x)}M'Y_x$. In these formulae, M is a metal from Groups IV–B, V–B, VI–B, VII–B and VIII of the Periodic Table; X is a halide or alkoxyl group, and $p$ is the valence of M. R is an aryl or alkyl radical, M' is a metal from Groups I–A, II–A, II–B and III–A of the Periodic Table. Y is a halide radical, $z$ is the valence of M' and $x$ is zero, 1 or 2.

As will be evident to those skilled in polymer chemistry, it is important when using one of the catalyst systems discussed above to conduct the polymerization under substantially oxygen-free, carbon dioxide-free and anhydrous conditions since the activity of these catalyst systems is impaired by the presence of any substantial amount of oxygen, carbon dioxide or water. Oxygen is readily removed by sweeping the reaction vessel with nitrogen or other inert gas. Water may be avoided by employing dry materials or removing from the system by azeotropic distillation of the organic suspending solvent, such as toluene.

We have discovered that it is important in our process to treat the metal particles with one of the components of the catalyst system while such component is capable of being fixed on, or absorbed by, the metal particles and before the two catalyst components have been mixed together long enough to react substantially with each other. We have found that if the catalyst components are mixed together as much as five minutes before addition to the metal particles, substantial amounts of separate particles of polymer are formed apart from the metal particles and a substantial portion of the metal particles are not enclosed or encased in shells of the polymer and can be separated from free polymer by flotation techniques.

When the metal particles are treated with any one of the catalyst components before this component is fully reacted with the other catalyst component, the polymerization takes place at and on the surface of the metal particles building up a shell of any desired thickness on the particles. When finely divided particles of metal are thus treated, the particles carrying the polymer shells remain substantially separate and discrete, and substantially no polymer appears to form as independent and separate pieces of polymer.

Accordingly, in the practice of the invention, we prefer to treat the metal particles with either one of the components of the catalyst system and then add the other component or components of the catalyst system to the treated metal particles. The polymer may then be formed by polymerization on the metal particles as soon as the catalyst components have had an opportunity to react with each other. This usually requires only a short time, even at room temperature.

We have also found it desirable to avoid the use of too large a proportion of catalyst in excess of the amount needed to form active polymerization sites on the metal particles. If too large an amount of catalyst is used in relation to the amount of metal treated, at least a portion of the polymer is formed independently of the metal particles and not in the form of shells around the particles. It has been found effective in maintaning the formation of active sites on the metal particles and, at the same time, avoiding the formation of free sites, to treat the metal particles with one of the components of the catalyst system in the proportion of not substantially less than 0.06, and preferably not less than 0.1, and not substantially more than 2.4 millimoles of catalyst component for each gram of metal. Where substantial quantities of polymer are to be formed on the metal particles it is preferred to limit the treatment of the particles to not substantially more than 1.0 millimole of the catalyst component per gram of metal.

The proportions of the components of the catalyst system may be varied depending on the particular components employed and the properties desired in the polymer. For most purposes and with most components, a molar ratio between the components of 1 to 1 has been found most satisfactory. By varying the molar proportioning between the catalyst components as is well known in the polymer art, the molecular properties of the polymer formed on the metal particles may be varied.

The catalyst components appear to become fixed on the metal particles either physically or by chemical reaction before the polymerization of the olefin is started, although we do not wish to be bound by any particular theory or mechanism of operation.

Particles of a wide variety of metals may be encased in accordance with the present invention. The properties of the resulting encased product will depend, of course, upon the metal particles treated and the use for The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A process for forming a casing of polymer on particles of metal so that each particle is substantially encased in a shell of the polymer comprising treating metal particles with the components of a multi-component catalyst system before said components have fully reacted with each other and polymerizing an aliphatic 1-olefin containing less than six carbon atoms on said particles by bringing the catalyst treated particles into contact with said olefin for a sufficient length of time and under conditions to form a shell of polymer thereon.

2. A process for treating metal particles to form casings of polymer thereon which comprises treating said particles with the components of a multi-component catalyst system the components of which, upon reaction with each other, provide an initiator effective at low pressures for polymerizing 1-olefins, at least one of the components of said component system being active with said metal particles at the time said metal particles are treated with said components and polymerizing an aliphatic 1-olefin containing less than six carbon atoms on said particles by bringing the catalyst treated particles into contact with said 1-olefin for a sufficient length of time and under conditions to form a substantial amount of polymer thereon.

3. A process for treating metal particles to form casings of polymer thereon which comprises treating said metal particles with one component of a multi-component catalyst system the components of which, upon reaction with each other, provide an initiator effective at low pressures for polymerizing 1-olefins, reacting the treated metal particles with the remaining component of the catalyst system, at least one of the components of the catalyst system being present in an amount not substantially less than 0.06 and not substantially more than 2.4 millimoles per gram of metal particles, and polymerizing an aliphatic 1-olefin containing less than six carbon atoms on said material by bringing the catalyst treated material into contact with said 1-olefin for a sufficient length of time and at controlled temperatures to form polymer casings directly on said metal particles.

4. In a process as recited in claim 3 in which said 1-olefin is ethylene.

5. In a process as recited in claim 3 in which said 1-olefin is propylene.

6. A process for treating metal particles to form casings of polymer thereon which comprises treating said particles with the components of a multi-component catalyst the components of which, upon reaction with each other, provide an initiator effective at low pressures for polymerizing 1-olefins, at least one of the components of said component system being active with said metal particles at the time said metal particles are treated with said components, said active component being present in an amount not substantially less than 0.06 and not substantially more than 2.4 millimoles per gram of metal partitcles and polymerizing an aliphatic 1-olefin on said particles by bringing the catalyst treated particles into contact with said 1-olefin to form a casing of polymer on said particles.

7. In a process as recited in claim 6, said active component being present in an amount not substantially less than 0.1 and not substantially more than 1.0 millimole per gram of metal particles.

8. A process as defined in claim 6 wherein said polymerizing step is carried out at atmospheric pressure and at a temperature between about 20 and 100° C.

9. A process for treating metal particles to form casings of polymer thereon which comprises treating said particles with a transition metal compound selected from the group consisting of halides and esters of titanium, zirconium, vanadium and chromium, said metal particles being treated with not substantially less than 0.06 and not substantially more than 2.4 millimoles of said transition metal compound per gram of metal particles, reacting the treated particles with a re-agent selected from the group consisting of alkyl and aryl compounds of one of the metals lithium, sodium, potassium, magnesium, calcium, zinc, cadmium, boron and aluminum and polymerizing step is carried out at atmospheric pressure and at atoms on said particles by bringing the treated and reacted particles into contact with said 1-olefin for a sufficient length of time and under controlled temperature conditions to form a casing of polymer around each of said particles.

10. A process for forming a casing of polymer in situ on particles of a metal so that each particle is substantially encased in a casing of the polymer comprising treating metal particles with a catalytic material to form active catalyst sites on said particles and, thereafter, polymerizing an aliphatic 1-olefin on said particles by bringing the catalyst activated particles into contact with said olefin for a sufficient length of time and under conditions to form a casing of polymer thereon.

11. A moldable composition which comprises a free-flowing granular material of discrete particles, each of said particles having a center of a finely-divided metal particle substantially encased in a shell of a polymer of an aliphatic 1-olefin monomer, said discrete particles being substantially proportional in size to the finely-divided metal particle encased therein.

12. In a composition as recited in claim 11, said polymer being of an aliphatic 1-olefin monomer containing less than six carbon atoms, said composition being substantially devoid of free metal and free polymer.

13. In a composition as recited in claim 11, said polymer being polyethylene.

14. In a composition as recited in claim 11, said polymer being polypropylene.

15. A process for forming articles of polyolefin encased metal particles wherein the metal particles are uniformly distributed throughout said article which comprises treating metal particles with the components of a multi-component catalyst system while one of the components of said catalyst system is active with said metal particles to form active catalyst sites on said metal particles, thereafter polymerizing an aliphatic 1-olefin on said particles by bringing the catalyst activated particles into contact with said 1-olefin to form a casing of polymer thereon, depositing said particles with said casing thereon into a form and, thereafter, fusing and hardening the polymer casing on said particles to fuse said particles together into a self-sustaining article.

16. In a process as recited in claim 15, said fusing being by heat.

17. A process for treating metal particles to form casings of polymer thereon which comprises treating said particles with a reagent selected from the group consisting of alkyl and aryl compounds of one of the metals lithium, sodium, potassium, magnesium, calcium, zinc, cadmium, boron and aluminum, said metal particles being treated with not substantially less than 0.06 and not substantially more than 2.4 millimoles of said reagent per gram of metal particles, reacting the treated particles with a transition metal compound selected from the group consisting of halides and esters of titanium, zirconium, vanadium and chromium and polymerizing an aliphatic 1-olefin containing less than six carbon atoms on said particles by bringing the treated and reacted particles into contact with said 1-olefin for a sufficient length of time and under controlled temperature conditions to form a casing of polymer around each of said particles.

18. A polyolefinic product consisting essentially of a polymer of an aliphatic 1-olefin monomer containing less than six carbon atoms and substantially individual metal particles, each of said individual metal particles being encased in said polymer, said metal particles being joined each to the other by said polymer.

19. A process for encasing metal particles in shells of polymer to form a free-flowing granular material of polymer encased discrete particles, each of said discrete particles having a center of finely-divided metal substantially encased in a shell of polymer, said shell being substantially proportional in size to the metal center contained therein, which comprises treating finely-divided metal particles with not substantially less than 0.06 and not substantially more than 2.4 millimoles per gram of metal particles of one component of a multi-component catalyst system the components of which, upon reaction with each other, form active sites of polymerization initiator effective for polymerizing 1-olefins to affix said one component to said particles, reacting the treated metal particles with the remaining component of the catalyst system to react said one component on said particles with said remaining component of said catalyst system and to form and affix on said particles the active sites of polymerization initiator as said sites are formed by the reaction of said components and, thereafter, polymerizing an aliphatic 1-olefin containing less than 6 carbon atoms on said particles by bringing the catalyst treated particles with said active sites of polymerization initiator formed thereon into contact with said 1-olefin to polymerize said olefin on said metal particles to form a shell of a polymer on each of said particles of metal, said shells being substantially proportional in size to the metal particle contained therein.

References Cited by the Examiner

UNITED STATES PATENTS

| | | | |
|---|---|---|---|
| 2,153,553 | 4/1938 | Fawcett et al. | |
| 2,204,743 | 6/1940 | Yngve | 260—41 |
| 2,303,361 | 11/1942 | Yngve | 260—41 |
| 2,303,504 | 12/1942 | Ryan | 117—100 |
| 2,356,954 | 8/1944 | Teter | 117—100 |
| 2,406,039 | 8/1946 | Roedel | 117—132 |
| 2,472,680 | 6/1949 | Pratt | 117—100 |
| 2,849,429 | 8/1958 | Cines | 252—411 X |
| 2,909,512 | 10/1959 | Bruce | 252—430 |
| 2,954,367 | 9/1960 | Vanderberg | 260—88.1 |
| 2,965,514 | 12/1960 | Less et al. | 117—100 |
| 2,965,626 | 12/1960 | Pilar | 260—94.9 |
| 2,967,789 | 1/1961 | Hoyt | 117—100 |
| 2,976,253 | 3/1961 | Edwards | 117—100 |
| 2,989,516 | 6/1961 | Schneider | 260—88.2 |
| 3,005,693 | 10/1961 | Thomas et al. | 260—88.2 |
| 3,008,943 | 11/1961 | Guyer | 260—93.7 |
| 3,048,537 | 8/1962 | Pall et al. | 264—126 |
| 3,082,195 | 3/1963 | Peters et al. | 260—93.7 |
| 3,121,698 | 2/1964 | Orsino et al. | 117—100 X |

WILLIAM D. MARTIN, *Primary Examiner.*

ROGER L. CAMPBELL, RICHARD D. NEVIUS,
*Examiners.*

R. C. LYNE, R. E. ZIMMERMAN, S. W. ROTHSTEIN,
P. F. ATTAGUILE, *Assistant Examiners.* plastic sheet having the finely-divided manganese particles uniformly distributed throughout.

*Example 19*

10 grams of short copper filaments cut from fine electrical wiring were suspended in 300 cc. dry toluene and the system deaerated with nitrogen. 5.9 millimoles of titanium tetrachloride were added to the suspension and refluxed for 4 hours. 5.9 millimoles of triethylaluminum were then added after cooling to 50° C. and ethylene introduced into the suspension. The introduction and polymerization of ethylene was interrupted when 20% polymer formed on the metal particles. Microscopic examination showed that the copper filaments of the resulting free-flowing product which were refluxed were coated with polyethylene.

*Example 20*

15 gm. of free-flowing aluminum powder were suspended in 150 cc. dry toluene and the system deaerated with nitrogen. 0.005 mole of titanium tetrachloride were added and the suspension refluxed for 2½ hours. The reaction mixture was cooled while stirring and transferred to a pressure vessel providing agitation of the contents. Triethylaluminum (.01 mole) was added and propylene introduced into the pressure vessel at 45 p.s.i. pressure. The introduction and polymerization of propylene was carried out at 34° C. for 2 hours while agitating the pressure vessel and its contents. The contents of the vessel were slurried with 200 c. toluene, filtered, rinsed with methyl alcohol and dried. The free-flowing product contained 49.2% aluminum and 50.8% polypropylene. The insoluble product was hydrophobic and floated on water. Microscopic analysis of the free-flowing product showed that the aluminium was completely encased in polypropylene. Light grey plastic discs were molded from the encased metal at 100 p.s.i. and 175° C.

*Example 21*

50 lbs. of copper powder (less than 325 mesh) were suspended in 280 lbs. toluene and the suspension distilled to remove any moisture by azeotropic distillation of a small portion of the toluene. The system was deaerated with nitrogen. 0.3 lb. of titanium tetrachloride was added to the suspension and permitted to react for 9 minutes at 30° C. A 32% solution of triethylaluminum in heptane (0.56 lb.) was added to the suspension at a temperature of 30° C. and ethylene introduced into the suspension while elevating the temperature to 65° C. The reactor pressure was kept constant at 6 p.s.i.g. and the introduction and polymerization of the ethylene interrupted when 5.6% polymer formed on the copper powder. The product was purified by slurrying in alcohol and dried, providing a free-flowing powder. Microscopic examination showed that the copper particle were encased in polyethylene. The material molded into plastic discs in which the copper particles were uniformly distributed throughout the discs.

*Example 22*

15 lbs. aluminum powder were dispersed in 280 lbs. toluene and the suspension distilled to remove any moisture by azeotropic distillation of a small portion of the toluene. The system was deaerated with nitrogen. 0.32 lb. of titanium tetrachloride was added to the suspension and permitted to react for 11 minutes at 30° C. A 32% solution of triethylaluminum in heptane (0.59 lb.) was added at 30° C. and ethlene introduced into the suspension while elevating the temperature to 65° C. The introduction and polymerization of the ethylene was interrupted when 7.8% polymer formed on the aluminum powder. The product was purified by slurrying in alcohol and dried, providing a free-flowing powder. Microscopic examination showed the aluminum particles to be encased in polyethylene.

*Examples 23*

70 grams chromium powder (less than 325 mesh) were suspended in 1400 cc. dry toluene and the system deaerated with nitrogen. 0.0158 mole of titanium tetrachloride was added to the suspension and permitted to react for 15 minutes at 50° C. Triethylaluminum (.0158 mole) was then added and ethylene introduced into the suspension while elevating the temperature to 65° C. The introduction and polymerization of ethylene was interrupted when 25% polymer had formed on the chromium powder. The product was purified by slurrying in alcohol and dried. Microscopic examination of the resulting free-flowing powder showed that the metal particles were encased in polyethylene. The material molded into a strong plastic sheet.

The free-flowing polyolefin encased product produced by the process of the invention has properties substantially different from mechanical mixtures of metal particles and polymer. Upon mechanical mixing of metal particles and polymer, some of the properties of the polymer are adversely affected. On the other hand, when the polymer is formed on the metal particles in accordance with the present invention, little, if any, adverse effect can be observed in the polymer. In fact, some properties of the polymer are improved.

In the higher percentages of polymer loading, for example in products containing about 5% or more by weight of polymer, the material may be particularly readily molded, cast, or extruded into sheets, discs, or the like. In lower polymer loading, that is, where the metal content is about 95% by weight or higher, while the polymer is formed around the metal particles, the amount of polymer present is generally insufficient to produce a strong bond when molded or extruded alone by conventional processes. However, such materials have many advantages over metal particles alone as an additive for paint and the like, where high metal addition is desired. The relatively thin polymer shells, formed around the particles at these higher metal loadings, aid in dispersion and bonding of the metal particles to the material to which the polymer encased metal is added.

The polyolefin encased metal compositions of the present invention have a number of uses. The polyolefin coating permits storage of highly reactive or readily oxidized metals, such as mercury, boron, etc. by retarding the action of air, oxygen, water and other reactive materials on the encased metal particles. Polyolefin encased iron, nickel and cobalt compositions of the invention can be made magnetic without also being conductors of electricity. When the metal is opaque to radiation, the product may be employed as a radiation shield. The products in accordance with the present invention may be employed in powdered metallurgy by igniting the polymer casing so that the metal sinters to provide a more porous product having an improved distribution and uniformity of the metal in the sintered product. Molded articles produced from the products of the present invention may also be employed as electrical resistors, etc.

Polyolefin encased lead powder in accordance with the invention may be used as a shielding material for gamma radiation. Encased lead particles may be molded to provide gloves, laboratory aprons, blocks, bricks, walls, etc. and provide radiation shielding. Aluminum encased particles in accordance with the present invention will provide protection against beta radiation and an encapsulated mixture of aluminum and lead powders will provide shielding against beta and gamma radiation.

Encapsulated mercury droplets in accordance with the invention retard the oxidation of the mercury and molded articles produced from these polyolefin encased mercury droplets provide a repository form of mercury.

was cleaned in methyl alcohol and dried. Photomicrographs showed encapsulation of silicon particles in the polyethylene matrix. The material, a free-flowing powder, molded into a strong plastic disc.

*Example 11*

175 grams standard pulverized lead (100% through 200 mesh, 90% through 325 mesh) were dispersed in 3500 cc. toluene, the system deaerated with nitrogen and 40 millimoles of titanium tetrachloride added and permited to react for a half hour at 35° C. 40 millimoles of triethylaluminum were then added and ethylene introduced into the suspension while elevating the temperature to 56° C. The rate of gas absorption was maintained at 400 cc./min. and samples were taken when 7%, 14%, 25% and 40% by weight polymer had formed in the pulverized lead. The products were slurried in alcohol and dried. The products were free-flowing powders. With increasing polymer, the encased metal had a more uniform appearance. Materials containing 25 and 40% polymer completely floated on the surface of water and there was no evidence of separation of metal. At 15% polymer content some of the material sank in water. With only 7% polymer the entire composition sank in water. Microscopic examination showed that the lead particles were encapsulated in polyethylene. The samples were molded into plastic discs and these had a metallic appearance. Resistance measurements with a vacuum tube voltmeter on 3 gram discs gave infinite resistance on samples containing 7% and 25% polymer.

*Example 12*

90 lbs. dry pulverized lead employed in Example 11 were dispersed in 280 lbs. dry toluene and the system deaerated with nitrogen. 1 mole of titanium tetrachloride was added and permitted to react for 20 minutes at 85° F. 1 mole triethylaluminum was then added and ethylene introduced while the temperature was elevated to 75° C. The reaction was interrupted when 16.3% by weight of polymer had formed on the lead. The product was slurried in alcohol, filtered and dried. Microscopic examination of the free-flowing powder showed encapsulation of metal particles in polyethylene. The material was molded into strong plastic sheets and into plastic blocks of varying size and porosity.

*Example 13*

108 lbs. of dry pulverized lead were suspended in 280 lbs. dry toluene and the system deaerated with nitrogen. 1.8 moles of zirconium tetrachloride were added and permitted to stand for 20 minutes at 21° C., while being agitated. Ethylene gas was introduced 5 minutes after addition of the zirconium tetrachloride. Methyl magnesium bromide (2 lbs. of 3 N solution in toluene) was added and the temperature elevated to 35° C. in one half hour. A second portion of methyl magnesium bromide (1 lb.) to total 4 moles was then added and the addition and polymerization of ethylene continued while elevating the temperature to 52° C. The reaction was interrupted when 10% by weight polymer was contained on the lead. The product was purified by slurrying four times with 15 gallons of methanol and dried. Microscopic examination of the free-flowing powder showed encapsulation of lead particles in the polyethylene. The material was molded into strong plastic sheets and formed metallic plastic blocks of varying size and porosity.

*Example 14*

175 grams of finely-divided sponge iron were suspended in 3500 cc. dry toluene and the system deaerated with nitrogen. This was reacted with 40 millimoles of titanium tetrachloride at 35° C. for one half hour and then with 40 millimoles of triethylaluminum. Ethylene was introduced into the system while elevating the temperature to 47° C. Samples of encased iron were withdrawn at polymer contents of 2.8%, 5.4%, 10.3%, 14.6% and 22%. The materials were purified by slurrying in alcohol and dried. Microscopic examinations of the free-flowing powders showed that the metal particles were encased in polyethylene shells. The sample containing 2.8% polymer had insufficient polymer for pressing into a solid disc. The others molded into relatively strong plastic discs. A plastic disc of iron with 10.3% polyethylene was found to be ferromagnetic. Resistance measurements on 3 gram 1.25" plastic discs gave readings of less than 1 ohm on samples with 5.4 and 10.3% polyethylene.

*Example 15*

175 grams refinery nickel powder were suspended in 3500 cc. dry toluene and the system deaerated with nitrogen. 40 millimoles of titanium tetrachloride were permitted to react with the suspension for 35 minutes at 30° C. Triethylaluminum (40 millimoles) were then added and ethylene introduced into the suspension while elevating the temperature to 50° C. Samples were taken at polymer contents of 5.4%, 10.3%, and 14.6%. These were purified by slurrying in alcohol and dried. Microscopic examination of the free-flowing powders showed the metal particles to be encapsulated in the polyethylene.

*Example 16*

603 grams of iron-silicon alloy powder (less than 325 mesh) (containing 8.98% silicon and the remainder substantially iron) were suspended in 3500 cc. dry toluene and the system deaerated with nitrogen. 60 millimoles of titanium tetrachloride were permitted to react in the suspension for one half hour at 35° C. Then 40 millimoles of triisobutylauminum were added. Ethylene was then introduced and the temperature elevated to 52° C. Samples of product were withdrawn at polymer contents of 2.5%, 5.0% and 7.5% polyethylene. The products were purified by slurrying in alcohol. Microscopic examination of the free-flowing powders showed that the metal particles were encapsulated in the polyethylene. Molded discs of the powders were found ferromagnetic.

*Example 17*

70 grams stainless steel alloy powder (less than 100 mesh with average diameter of the particles —75 microns) (containing 16–18% chromium, 10–14% nickel and 2–3% molybdenum) were suspended in 1400 cc. dry toluene and the system deaerated with nitrogen. 0.0158 mole of titanium tetrachloride were added and permitted to react for 10 minutes at 50° C. Triethylaluminum (.0158 mole) was then added and the introduction of ethylene started while elevating the temperature to 65° C. The addition and polymerization of ethylene was interrupted when 19.5% polymer formed on the metal powder. The product had a uniform appearance, was free-flowing and no unencased metal particles were found. Microscopic examination showed that the metal particles were encapsulated by polymer. The average diameter of the encased particles was 150 microns. The material was molded into a strong plastic sheet having a metallic appearance. Resistivity measurements on sheets on 0.014" and .020" thickness gave a resistance of 15 meg./ohms.

*Example 18*

70 grams manganese powder (less than 325 mesh) were suspended in 1400 cc. dry toluene and the system deaerated with nitrogen. 0.0158 mole of titanium tetrachloride was added and permitted to react for 10 minutes at 50° C. Triethylaluminum (.0158) mole was then added and ethylene introduced into the suspension while elevating the temperature to 65° C. The introduction and polymerization of ethylene was interrupted when 23.5% polymer formed on the metal particles. The product was cleaned by slurrying in alcohol and dried, providing a free-flowing powder. Microscopic examination showed that the metal particles were encapsulated by the polyethylene. The material was molded to form a strong which the encased product is intended. Particles of substantially any metal may be encased with a polyolefin provided that the metal does not impair the activity of the catalyst system employed and does not itself react with the olefin employed. Among the metal particles which may be employed are those of metals of Groups I-B, II, III, IV, V-B, VI-B, VII-B, and VIII of the Periodic Table. Also, physical mixtures or alloys of two or more of these metals may be employed. Exemplary of such metals are copper, magnesium, barium, mercury, boron, aluminum, yttrium, titanium, germanium, lead, tin, vanadium, chromium, molybdenum, manganese, iron, cobalt, nickel, and the like.

The proportion of polyolefin which encases the metal particles may be varied over a wide range without the particles sticking together. At the end of the polymerization reaction the product is composed of particles generally proportional to the size of the original metal particles, the increase in size of the particle, of course, depending on the amount of polymer encased thereon. After the metal particles are enclosed in shells of polyolefin, the particles are very free-flowing and may be handled without any tendency of the treated particles to stick together.

The polyolefin encased particles of the invention are hydrophobic in nature and may be molded, cast or extruded in any of the conventional manners. Molding, casting or extruding may be accomplished with a solvent or heat and may be accompanied by pressure. In most instances, particularly where strong dense products are desired, it is preferred to form the articles with heat and pressure, followed by cooling. Temperatures as high as or somewhat above the crystalline melting point of the polymer coating may be employed. Where maximum tensile strength in the finished article and density are of importance, it is preferred to mold the material at a temperature at or slightly above the crystalline melting point of the polymer coating. With a polyethylene coating, a heating temperature as high as 310° F., or even higher, may be employed to obtain maximum tensile strength, while with products coated with polypropylene, other polyolefins or copolymers, the temperature of heating may be somewhat higher or lower depending on the crystalline melting point of the polymer coating.

Since the treated metal particles contain a center or nucleus of a metal surrounded by a case or shell of polyolefin, the molded article comprises metal particles suspended in a matrix of polyolefin. This matrix may be highly porous or may be dense and compact depending upon the degree of temperature and pressure employed in forming the article. Thus, where the treated particles are heated only for a short period of time to the crystalline temperature without the application of pressure, a porous article is formed. On the other hand, where the product is heated to the crystalline temperature and, while at the crystalline temperature, pressure is applied to the product, a dense and compact article is formed. In either event, the article formed consists essentially of individual particles of metal suspended in a matrix of polymer. Due to the initial uniform distribution of the metal particles in the granular powder, the metal particles are dispersed uniformly throughout the molded article.

In forming molded articles from the treated particles of the present invention, it is not necessary to melt all of the polymer. The polymer is merely softened and, in its softened condition, where desired, compacted with pressure. Thus, lower molding and extruding temperatures are required. This, of course, results in a more stable and uniform product to say nothing of the advantages attained by the even and uniform distribution of the metal particles in the finished product.

The molding materials of our invention can be used to form laminated structures in which the powder is fused, or pressed and fused, about rods, sheets or any desired core material to produce products for many and varied uses. Sheets or other articles made according to our invention can be readily heat-sealed or welded to each other or to other heat-sealing materials. Where desired, the products may be attached by the use of solvents rather than heat.

One simple and convenient way of carrying out the process and producing the encased metal product of the invention is by the slurry method in which the metal particles are suspended in a suitable inert liquid medium, such as an organic liquid, which does not react with either the metal, the olefin, or the polymer to be formed thereon. Suitable inert organic liquids or solvents include such hydrocarbons as: pentane, hexane, heptane, cyclohexane, benzene, xylene, toluene, etc. The metal particles may be treated with one of the catalyst components before or after it is placed in the suspending liquid. The other catalyst component is then brought into contact with the metal particles in the suspending liquid. It is preferred to add first the transition metal component of the catalyst system. Desirably, the slurry containing the metal particles and at least one of the catalyst components is heated, as by refluxing. Heating appears to provide a more tenacious bond between the metal particles and the polyolefin.

The slurry of catalyst treated metal particles in the organic liquid, after the second component of the catalyst has been added, is placed in a closed reaction vessel and the monomer is fed into the vessel at a suitable rate while agitating the slurry.

Provision should be made to control the temperature of the reaction vessel and the reaction should be carried out under reasonably anhydrous conditions. As polymerization proceeds, the slurry becomes thicker and reaction is stopped at any desired stage depending upon how much of the polymer is to be formed on the metal particles. The slurry can then be removed from the reaction vessel and pressed or filtered to remove the free organic liquid and then washed in water, methanol or other materials which easily dissolve out the bulk of the catalyst residue or inactivate the catalyst. Minor amounts of additives of the type conventionally employed with polymers, such as antioxidants, coloring pigments and the like, may be added to the metal particles before treatment or may be added during polymerization or thereafter.

The polymerization reaction may be carried out at atmospheric pressure or higher pressure if desired, and over a wide range of temperature. Ordinarily, the polymerization proceeds rapidly at atmospheric pressure and at a temperature between about 20° C. and about 100° C. The amount of polymer formed will vary with the time of the polymerization reaction, the particular catalyst used and the particular monomer or monomers being polymerized. Useful products are obtained by forming polymer on the metal particles in amounts from about 1% to about 95%, based on the total weight of the metal-polymer composition. Polymer encased metal particles wherein the polymer content is less than 5% of the total weight of the metal-polymer composition have been found to be particularly useful for pigmenting paint and the like while particles having a high polymer content, for example 10% to 80%, have been found to be particularly useful in pressure molding and other uses which are described herein.

In order more clearly to disclose the nature of the present invention, the following examples illustrating the invention are disclosed. It should be understood, however, that this is done solely by way of example and is intended neither to delineate the scope of the invention nor limit the ambit of the appended claims. In the examples which follow, and throughout the specification, the quantities of materials are expressed in terms of parts by weight, unless otherwise specified. Percentages of polyolefin or metal reported in the final product are intended to be by weight of final product (polymer plus metal). Mesh sizes are U.S. Standard Sieve Series.

Example 1

45 grams of powdered lead was dispersed in 500 cc. of toluene and the entire mixture was sparged with nitrogen. 0.02 mole of titanium tetrachloride was then added and the reaction mixture was then agitated for one-half hour. 0.045 mole of triethylaluminum was then added to the reaction mixture and ethylene was introduced into the reaction mixture. The reaction mixture was heated to 50° C. and maintained there until the desired amount, 45 grams, of ethylene was passed into the reaction mixture as measured by a flow meter. The flow of ethylene was then halted, and the reaction terminated. The product was filtered, and washed repeatedly with methanol. The resultant material, a free-flowing powder, was approximately 50% lead and 50% polyethylene by weight of final product.

Example 2

The procedure of Example 1 was repeated, except that in place of the 45 grams of ethylene used, there was used 5 grams of ethylene, and in place of the 0.045 mole of triethylaluminum, there was employed an equal molecular amount of methyl magnesium bromide. The resultant product was approximately 90% lead and 10% polyethylene by weight of final product.

Example 3

The procedure of Example 1 was repeated except that 10.2 grams of powdered boron was used instead of powdered lead, 140 cc. of dry toluene instead of 500 cc., 11 grams of ethylene was used, and the catalyst system used was 1.58 millimoles of titanium tetrachloride and 1.58 millimoles of triethylaluminum. The boron was handled under a nitrogen atmosphere at all times. The reaction mixture was heated to 60° C. and maintained there until the desired amount of ethylene, 11 grams, was passed into the reaction mixture. The flow of ethylene was then halted, and the reaction terminated. The product was filtered and washed repeatedly with methanol. The resultant material, a free-flowing powder, was approximately 63% polyethylene and 37% boron by weight of final product. In addition, it was found that the boron in the final product did not react with water, and did not react with methanol. Microscopic examination showed that the boron particles were encased in polyethylene.

Example 4

102 grams of liquid mercury were suspended in 1400 cc. toluene with a high speed agitator. The system was deaerated with nitrogen. To the agitated suspension were added 0.0158 mole of titanium tetrachloride and agitation continued for a half hour at 35° C. While continuing the agitation, 0.0158 mole triethylaluminum were added. Under constant agitation, ethylene was introduced into the suspension while elevating the temperature to 70° C. The rate of gas absorption was 426 cc./min. and polymerization of the ethylene was continued for 3.2 hours. Some mercury remained undispersed and settled out. This was separated out by slurrying the preparation in alcohol. The polymer product was a free-flowing powder which had a grayish cast. Microscopic examination revealed finely dispersed mercury particles encased in polyethylene. Analysis showed that the encased product contained 21.8% mercury. The product did not wet in water and floated on the surface.

Example 5

100 grams of electrolytic copper powder (less than 325 mesh) were dispersed in 1400 cc. dry toluene and air was swept from the system with nitrogen. 10 millimoles of titanium tetrachloride were added and mixed for a half hour at 35° C. 10 millimoles of triethylaluminum were then added to the suspension. Addition of ethylene gas was started while elevating the temperature to 60° C. Samples were taken at 10% and 18.7% ethylene polymer content. The products were cleaned by slurrying in methyl alcohol and dried. Microscopic examination of the resulting free-flowing powders showed copper particles to be encased with polyethylene polymer. The samples molded into plastic discs at 4000 p.s.i. and 150° C.

Example 6

10 grams of finely powdered gold (less than 325 mesh) were dispersed in 140 cc. dry toluene and air was swept from the system with nitrogen. 1.58 millimoles of titanium tetrachloride were added and mixed for a half hour at 35° C. 1.58 millimoles of triethylaluminum were then added to the suspension and addition of ethylene was started while elevating the temperature to 60° C. The reaction was interrupted when 17% ethylene polymer was formed on the gold powder. The product, a free-flowing powder, was cleaned in alcohol and dried. Microscopic examination showed the gold particles were encased by polyethylene. The product molded into plastic discs.

Example 7

10 grams atomized magnesium (less than 325 mesh) were dispersed in 140 cc. of dry toluene and air was swept from the system with nitrogen. 1.58 millimoles of titanium tetrachloride were added to the dispersion and the dispersion mixed for a half hour at 35° C. 1.58 millimoles of triethylaluimnum were then added. Ethylene was introduced into the dispersion while elevating the temperature to 60° C. The reaction was interrupted when 23% polymer formed on the magnesium. Microscopic examination of the resulting free-flowing powder showed magnesium particles to be encased by polyethylene. No free metal was found.

Example 8

75 grams aluminum powder (less than 325 mesh) (Grade HA–Charles Hardy Inc.), were vacuum dried, suspended in 1400 cc. dry toluene and the system deaerated with nitrogen. To the suspension were added 0.015 mole of titanium tetrachloride which was permitted to react in the suspension for a half hour at 35° C. Then 0.015 mole of triethylaluminum were added. Ethylene was introduced into the suspension while elevating the temperature to 63° C. The addition of ethylene and the reaction were terminated when 25% by weight of polymer was formed on the aluminum powder. The product, a free-flowing powder, was filtered and washed with water. Microscopic examination showed that the aluminum particles were uniformly encased in the polyethylene. The material molded into a strong plastic disc.

Example 9

9.5 grams of aluminum shreds (.00236″ diameter and 0.150″ long) were suspended in 800 cc. dry toluene and the system deaerated with nitrogen. 5.9 millimoles of titanium tetrachloride were added and the suspension refluxed for four hours. Triethylaluminum (5.9 millimoles) was added at 40° C. and ethylene introduced while elevating the temperature to 60° C. The reaction was terminated when 42% by weight of polyethylene encased the aluminum. The product was cleaned by slurrying in alcohol. The aluminum strands had a heavy coating of polymer which was tightly bound. Rubbing did not loosen the polymer from the aluminum strands. Photomicrographs showed a heavy coating of polymer closely bound to the aluminum strands.

Example 10

100 grams silicon powder (less than 200 mesh) were dispersed in 1400 cc. dry toluene and the system deaerated with nitrogen. 0.0158 mole of titanium tetrachloride were added and the suspension permitted to stand for a half hour at 35° C. Triethylaluminum (0.0158 mole) was then added and ethylene introduced while elevating the temperature to 63° C. The addition of ethylene and the reaction were stopped when 50% by weight of polymer formed on the silicon. The product